US012800787B2

(12) United States Patent
Chen et al.

(10) Patent No.: US 12,800,787 B2
(45) Date of Patent: Nov. 17, 2026

(54) BIT-SYMBOL MAPPING METHOD FOR MULTI-PULSE POSITION MODULATION IN PETROLEUM DRILLING EXPLORATION

(71) Applicant: Univ. Electronic Science and Technology of China, Chengdu (CN)

(72) Inventors: Wei Chen, Chengdu (CN); Xiufeng Li, Chengdu (CN); Xu Zhang, Chengdu (CN); Qingshui Gu, Chengdu (CN); Ruiqing Wu, Chengdu (CN); Conglin Ye, Chengdu (CN); Jingyi Lin, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 441 days.

(21) Appl. No.: 18/417,107

(22) Filed: Jan. 19, 2024

(65) Prior Publication Data

US 2024/0329273 A1 Oct. 3, 2024

(30) Foreign Application Priority Data

Mar. 31, 2023 (CN) ......................... 202310333751.4

(51) Int. Cl.
*G01V 1/50* (2006.01)
*E21B 47/20* (2012.01)
*E21B 49/00* (2006.01)

(52) U.S. Cl.
CPC ................ *G01V 1/50* (2013.01); *E21B 47/20* (2020.05); *E21B 49/00* (2013.01)

(58) Field of Classification Search
CPC ............ G01V 1/50; E21B 47/20; E21B 49/00
See application file for complete search history.

(56) References Cited

U.S. PATENT DOCUMENTS 4,908,804 A 3/1990 Rorden
2004/0160692 A1* 8/2004 Kirby ................ G11B 20/1407 360/39

(Continued)

OTHER PUBLICATIONS

Wei Chen et al., "Efficient Encoding Method for Combined Codes in the MWD Telemetry System," Electronics 2023, 12, 4683; https://doi.org/10.3390/electronics12224683; MDPI, Basel, Switzerland.

*Primary Examiner* — Janice N Tieu
(74) *Attorney, Agent, or Firm* — Central California IP Group, P.C.; Andrew D. Fortney

(57) ABSTRACT

Disclosed is a bit-symbol mapping method using multi-pulse position modulation (MPPM), which relevant to the field of signal processing. An index of each dimension of an N-order M-dimensional matrix may be a pulse position number of a MPPM(N, M) symbol. The method includes mapping integers to a super-triangular area of the N-order M-dimensional matrix and establishing a correlation between the integers and the N-order M-dimensional matrix elements. In this way, a correspondence between a bit sequence and a MPPM(N, M) symbol is established using a correspondence between the N-order M-dimensional matrix element and an index number of each dimension of the N-order M-dimensional matrix element. A mathematical expression of the number of integers mapped to each layer in each dimension of a super-triangular area of an N-order M-dimensional matrix is used to generate a lookup table $T_{LUT}$.

20 Claims, 2 Drawing Sheets

(56) References Cited

U.S. PATENT DOCUMENTS

| | | | | |
|---|---|---|---|---|
| 2023/0267313 | A1* | 8/2023 | Kim | G06N 3/0464 706/27 |
| 2025/0148329 | A1* | 5/2025 | Healy | G06N 10/20 |

* cited by examiner

BIT-SYMBOL MAPPING METHOD FOR MULTI-PULSE POSITION MODULATION IN PETROLEUM DRILLING EXPLORATION

RELATED APPLICATIONS

The present application claims priority to Chinese Pat. Appl. No. 2023103337514, filed Mar. 31, 2023, the contents of which are incorporated by reference herein in their entirety.

TECHNICAL FIELD

The present invention belongs to the field of signal processing, and in particular, to systems and methods of MWD (Measurement While Drilling) telemetry in the field of petroleum exploration.

BACKGROUND

Multi-pulse position modulation (MPPM) has high energy efficiency, and is widely applied to the fields of optical communication, deep space communication, while-drilling telemetry transmission, and the like. Generally, in MPPM, it is difficult to establish a regular mapping relationship between B (e.g., the encoded bit sequences) and the M time slots that MPPM maps. Therefore, at the transmitting end, the mapping of the bit sequences or symbols is usually realized by querying an encoding table. However, the memory complexity of the encoding table increases exponentially with the bit width of B. Therefore, a symbol having a large bit width may make the complexity of the encoding end unacceptable in some application scenarios.

For example, in a transmission-while-drilling system, the encoder may be located downhole in a rough or harsh environment, and the data sender (e.g., transmitter) of a measurement-while-drilling (MWD) telemetry system in the field of petroleum exploration is located in a deep underground well or hole having a depth of thousands of meters or even tens of thousands of meters. Generally, such an operating environment is very rough (high temperature and high pressure). Therefore, the storing and computing performance of the processor at the sending end (e.g., transmitter) are very limited, leading to occasional failure when implementing a complex encoding method.

A combination code (CC) is a variant of MPPM, and is widely applied to MWD telemetry systems in the field of petroleum exploration. However, an encoding table to map between the bits corresponding to a symbol and the symbol (or a corresponding transmitted pulse sequence) is generally adopted since it is difficult to establish a simple mapping relationship between the bits and the pulse sequence or symbol, regardless of the MPPM technique or other coding technique. As the bit width increases, the storage complexity of code tables grows exponentially, which is unacceptable for downhole transmitters operating in harsh environments.

SUMMARY

The present invention solves one or more problems in the prior art in which multi-pulse position modulation may be unacceptable in petroleum exploration.

At least one technical solution of the present invention relates to a bit-symbol mapping method in multi-pulse position modulation (MPPM), which may be particularly useful in oil drilling/exploration. The method may comprise (1) mapping integers to a super triangle area of a multi-dimensional matrix, and (2) looking up or mapping one or more MPPM pulse sequences or symbols in a mapping or look-up table, wherein:

mapping the integers to the super-triangular area of the multi-dimensional matrix comprises:

representing transmission of M pulses in N time slots with MPPM(N, M) (e.g., to represent transmitted information), wherein the M pulses may be used to send a survey signal (e.g., in the well), and M is greater than or equal to 2;

constructing an N-order M-dimension matrix (e.g., matrix 1, FIG. 4) from MPPM(N, M), wherein each of the M dimensions of the matrix is respectively denoted as: $R_1$, $R_2$, . . . , $R_M$ (e.g., $R_1$ through $R_M$);

successively mapping integers from 0 to $$C_N^M - 1$$

to a triangular area (e.g., the super triangular area) of the matrix, where $$C_N^M$$

is a total number of MPPM(N, M) pulse sequences or symbols; and mapping a 1st dimension of the M dimensions from a subscript 1, a 2nd dimension of the M dimensions from a subscript 2, up to an Mth dimension of the M dimensions from a subscript M', wherein the subscripts 1, 2, . . . M' denote an index number of an element in the M-dimensional matrix (e.g., in each dimension and/or in the respective dimension[s]), and M' may be an integer of 1 to N.

In one example, the method may further comprise stacking a plurality of 1-dimensional matrices to form 2-dimensional triangle area, and when the subscript is 2 to N in the 2nd dimension, a number of elements of 1-dimensional areas mapped from each subscript may comprise is, in sequence, 1, 2, 3, 4 . . . (e.g., the integers from 1 to $$C_N^M$$

).

In another example, a 3-dimensional matrix may be formed by stacking a plurality of 2-dimensional matrices. In the 3rd dimension, when the subscript is 3 to N, the number of elements of the 2-dimensional triangle area(s) mapped from each subscript comprises, in sequence, 1, 3, 6, . . . (e.g., N−2 numbers, from 1 to [N−2]+[N−1], where each number greater than 1 is according to the formula $F_x=F_{x-1}+x$, and x is successively an integer from 2 to N−2).

Similarly, an m-dimensional matrix may be formed by stacking (m−1)-dimensional matrices, where m is a variable integer of greater than or equal to 2 and less than or equal to M (e.g., decreasing in succession from M to 2). In the mth dimension, a subscript i=m,m+1, . . . , N and the number of elements of the m−1-dimensional super triangular area to which each subscript maps, $$a_i^{(m)},$$

is:

$$a_i^{(m)} = C_{i-1}^{m-1},\ i = m, m+1, \ldots, N$$

Thus, for N-order M-dimensional supermatrices $$T_{\underbrace{N\times N\times \ldots \times N}_{M\uparrow}},$$

the number of elements of the super triangular area to which the integers are mapped may be equal to the total number of MPPM(N, M) pulse sequences or symbols, namely:

$$\sum_{i=M}^{N} a_i^{(M)} = \sum_{i=M}^{N} C_{i-1}^{M-1} = C_N^M$$

A one-to-one mapping relation is established between the integers 0 to $$C_N^M - 1$$

and each MPPM(N, M) symbol or pulse sequence; that is, a one-to-one mapping relation may be established between a K-bit bit sequence B and $2^K$ (e.g., the first $2^K$) MPPM(N, M) symbols or pulse sequences, wherein $$K = \left\lfloor \log_2^{C_N^M} \right\rfloor,$$

rounded down to the nearest integer. By employing the one-to-one mapping relationship, bit-to-symbol mapping of MPPM(N, M) is simplified.

Looking up or mapping the MPPM symbols in the look-up or mapping table comprises:

Establishing a lookup table $T_{LUT}$ with $M_{max}$ rows and $N_{max}$ columns using $$a_i^{(m)},$$

wherein $T_{LUT}$ has a space complexity that is less than that of an encoding table (e.g., a table directly correlating each possible bit sequence to an MPPM(N, M) symbol or pulse sequence), and $M_{max}$ and $N_{max}$ are maximum values of M and N, respectively. For example, according to the $T_{LUT}$, a bitmap for MPPM(N, M) where $N \le N_{max}$, $M \le M_{max}$ may be realized in which the K-bit bit sequence B is mapped to M pulse positions of the N time slots in the MPPM(N, M) coding scheme.

Looking up or mapping the MPPM symbols in the look-up or mapping table (or generating the look-up or mapping table of MPPM pulse sequences or symbols) may further comprise initializing $[p_1, p_2, \ldots, p_M]=0$, and B=the K-bit bit sequence(s) to be encoded; and calculating $[p_1, p_2, \ldots, p_M]$ as follows:

$R_m$ is equal to the index of the first element greater than B in the $M^{th}$ row of $T_{LUT}$, and $p_M=R_m$, where $R_m$ is the index of the $m^{th}$ dimension that includes B, and $p_M$ may refer to the bit width of B corresponding to M (e.g., where M is the $M^{th}$ dimension); then iteratively decrease m from M to 2, and for each value of m, sequentially perform the following calculation:

$R_m$=the index of the first element greater than $B-T_{LUT}(m, R_m-1)$ in the $(m-1)^{th}$ row of $T_{LUT}$, and $$p_{m-1} = R_m.$$

In typical examples, the $M^{th}$ row or line of $T_{LUT}$ is a set of numbers (e.g., positive integers) in ascending order. These numbers are numbered in ascending order starting from 1, which is the index of the numbers. The lookup operation comprises searching $T_{LUT}$ sequentially starting from the first number (i.e., the smallest number) until the first number (or integer) greater than B is found. The index of this found number is the index of the first element.

For example, representing transmission of M pulses in N time slots with MPPM(N, M) may comprise selecting integer values for each of M and N, where N>M (and may be greater than or equal to 2M).

The present invention uses the index of each dimension of the N-order M-dimensional matrix as a pulse position number of the MPPM(N, M) symbols, mapping the integers to a super-triangular area of the N-order M-dimensional matrix one by one, and establishing a corresponding relation between the integers and the N-order M-dimensional matrix elements. In this way, the corresponding relation between the bit sequences (to be encoded) and the MPPM(N, M) pulse positions or symbols is established by utilizing the corresponding relation between the N-order M-dimensional matrix element and the index number of each dimension thereof.

The present invention may also build up the mathematical expression of the mapped integers and/or numbers of/in each layer in each dimension of the super-triangular area of the N-order M-dimensional matrix $$\left(\text{e.g., } a_i^{(m)} = C_{i=1}^{m1},\ i = m, m+1, \ldots, N\right),$$

and use the resulting mathematical expression to generate a lookup table $T_{LUT}$. The spatial complexity of $T_{LUT}$ may be much less than that of a conventional MPPM(N, M) code table. Based on $T_{LUT}$, the method of encoding and/or mapping bits to MPPM(N, M) symbols in a lookup table is established, making it possible to widen the application range of multi-pulse position modulation technology. When the method of the present invention is adopted, specific benefits can be seen as follows: 1. the overhead of the memory is small, and the method can be applied to a system with limited memory, such as a single-chip microcomputer system; 2. the calculation overhead/logic is small, and can be applied to underground data transmission in oil exploration; 3. the mapping of bits to symbols is regular, and can be easily extended to any bit width and any combination of M and N (e.g., where M is at least 2 and N is at least 4).

The present invention may be described in Chen et al., *Electronics* 2023, 12, 4683, doi.org/10.3390/electronics12224683, the relevant portions of which are incorporated herein by reference.

DETAILED DESCRIPTION

The encoding principles of MPPM(N, M) coding schemes include dividing the transmission time of a symbol into N time slots of equal length, and each symbol has M time slots in which to transmit a pulse. The remaining time slots are silent (i.e., do not include a pulse; see, e.g., slots 2, 4 and 5 in FIG. 1).

Definition 1: The time slot is a time interval with a duration of $T_S$, and a time slot with a sequence number of i is denoted as:

$$s_i \in [t_0 + (i-1)T_S,\ t_0 + iT_S),\ i = 1, 2, \ldots, N$$

The term $t_0+(i-1)T_S$ is the starting boundary of the time slot, and the term $t_0+iT_S$ is the ending boundary of the slot. N consecutive and/or continuous slots form a coding interval for pulse position modulation $s_N$ and/or an MPPM symbol $s_{AC}$: $s_{AC}=[s_1, s_2, \ldots, s_N]$. $t_0$ is the starting boundary of the symbol (e.g., $s_{AC}$). The set $Z_N=\{1, 2, \ldots, N\}$ is the set of time slot numbers in or on the coding interval $s_N$.

Definition 2: The multi-pulse position modulation (MPPM) coding scheme is as follows: M (M≥2) pulses are transmitted in N time slots (N>M) to represent information, denoted as MPPM(N, M). The MPPM(N, M) coding scheme has a total of $$C_N^M$$

symbols, which can represent $$C_N^M$$

different information states (bit sequences). Here, $$c_N^M = \frac{N!}{M!\,(N-M)!},$$

and is the number of different possible combinations of M pulses in N time slots.

Taking the MPPM(5,2) coding scheme as an example, there are 10 different symbols (i.e., possible combinations of M pulses in N time slots) in total. When N is 5 and M is 2, $$K = \left\lfloor \log_2^{C_N^M} \right\rfloor$$

rounded down to the nearest integer is 3, and 8 symbols of this 10-symbol group can be used to represent the 8 possible unique 3-bit sequences of digital information (e.g., combinations of 0 and 1 states) in one-to-one mapping between the MPPM(5, 2) symbols or pulse sequences and all possible 3-bit sequences B.

Figure 1:
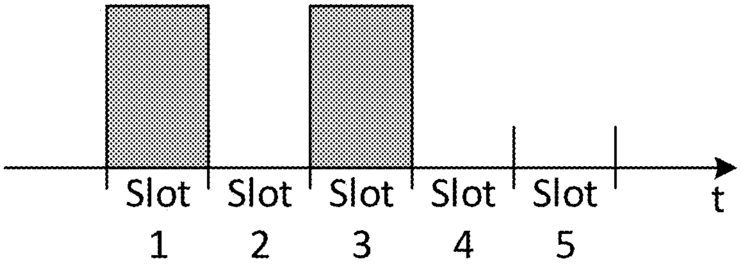
FIG. 1 is an example of a pulse sequence corresponding to a MPPM(5,2) symbol mapped to a bit sequence 001.

The time slot positions coded as "1" in the time slot code in Table 1 below indicate that a pulse is transmitted in this time slot. For example, a pulse sequence represented by 10100 is shown in FIG. 1. The pulse sequence/time slot code 10100 corresponds to a digital bit sequence 001 and an MPPM(5, 2) symbol 2, as shown in Table 1.

Various configurations of MPPM coding schemes (e.g., number of possible symbols or code words) for different bit widths is shown in Table 2 below, wherein M is the number of pulses, and N is the number of time slots in each symbol. As can be seen from Table 2, an encoding table with a bit width of 16 bits may need to store 65536×6 units or pieces (e.g., bits) of pulse position data. This is an unacceptably high overhead burden in an application scenario where a single chip microcomputer (e.g., microcontroller or microprocessor) is the main component. When the value of M is equal to 1 or 2, it is relatively easy to establish a regular mapping relation between bit sequences and MPPM symbols, and related solutions have been proposed already. The main problem to be solved herein is how to establish a regular mapping relation between bit sequences and MPPM symbols when M≥3, thereby reducing the complexity of transmitters and/or receivers in underground drilling equipment and/or operations.

MPPM(N, M) Bits-to-Symbols Mapping Method

Super-Triangular Area Mapping of Integers to Multi-Dimensional Matrices

In the present MPPM(N, M) coding scheme, an N-order M-dimensional matrix $$T_{\underbrace{N\times N\times \ldots \times N}_{M\uparrow}}$$

is constructed, and each dimension thereof is respectively denoted as: $R_1, R_2, \ldots, R_M$. Integers from 0 to $$C_N^M - 1$$

are sequentially mapped to an element of an M-dimensional tensor T, using the index number of the tensor element in each dimension as the pulse position of the codeword symbol mapped from the integer. Typically, the tensor is an M-dimensional matrix, and the integers are mapped to a triangular (2-dimensional or more, referred to as super-triangular) area of the matrix/tensor T. In some embodiments, the integers are mapped to a lower or lower left triangular region of the matrix (without diagonal elements). The $1^{st}$ dimension starts mapping from an index subscripted as 1, the $2^{nd}$ dimension starts mapping from an index subscripted as 2, up to an $M^{th}$ dimension that starts mapping from an index subscripted as M. In some implementations, 0 may be mapped at T(1, 2, . . . , M).

Figure 2:
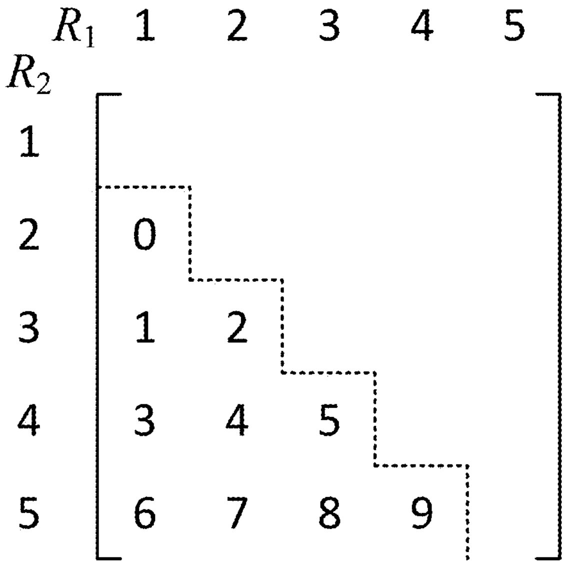
FIG. 2 is an exemplary $2^{nd}$ dimension matrix of integers mapped by an exemplary MPPM(5, 2) coding scheme.

For example, for MPPM(5, 2), a two-dimensional 5×5 matrix may be constructed, and the integers 0-9 are mapped to the two-dimensional tensor $T_{5\times 5}$ as shown in FIG. 2.

Figure 3A:
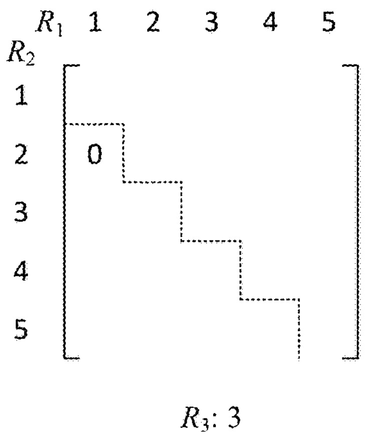
FIGS. 3A-C are exemplary $3^{rd}$ dimension matrices of integers mapped by an exemplary MPPM(5, 3) coding scheme.
Figure 3B:
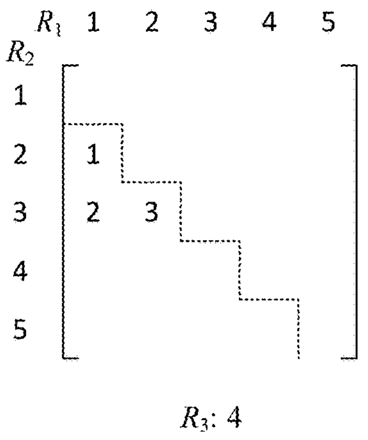
Figure 3C:
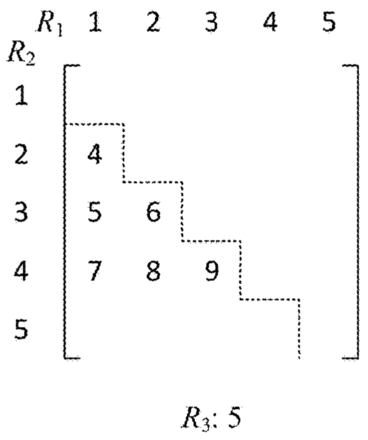
Figure 4:
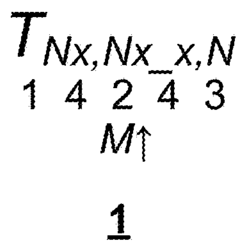
FIG. 4 is a representation of an exemplary N-order M-dimension matrix.

For MPPM(5,3), a three-dimensional 5×5×5 or (5×5×3) matrix may be constructed, as shown in FIGS. 3A-C. A first dimension of the three-dimensional matrix is shown in FIG. 3A, a second dimension of the three-dimensional matrix is shown in FIG. 3B, and a third dimension of the three-dimensional matrix is shown in FIG. 3C. In the case of the 5×5×5 matrix, the remaining dimensions may contain zero elements or integers.

As shown in FIG. 2, a two-dimensional triangular area may be formed by stacking a plurality of 1-dimensional matrices. In the $2^{nd}$ dimension, the numbers (e.g., integers) 1 to N are subscripted (the integers 1 to N also being subscripted in the $1^{st}$ dimension), and the number of elements of the 1-dimensional area are mapped by or according to each subscript as follows in sequence: 1, 2, 3, 4 . . . up to $$C_N^M.$$

For example, the numbers 1 to $$C_N^M$$

are positive integers, the 1-dimensional area may be one or more corresponding 1-dimensional matrices, the number of elements of the 1-dimensional area may be mapped into a super (e.g., lower left) triangle of the matrix (see, e.g., FIG. 2), and the number of elements by or according to each subscript may comprise non-negative integers up to $$C_N^M - 1.$$

As shown in FIGS. 3A-C, a three-dimensional matrix may be formed by stacking a plurality of two-dimensional matrices. In the $3^{rd}$ dimension, the numbers (e.g., integers) 3 to N are subscripted, and the number of elements of the two-dimensional triangular areas to which each subscript maps sequentially is: 1, 3, and 6.

Similarly, the M-dimensional matrix may be formed by stacking M−1 dimensional matrices. In the $M^{th}$ dimension, i=m,m+1, . . . , N (or i=M, M+1, . . . , N) are subscripted, and the number of elements of the M−1 dimensional super triangle area to which each subscript maps is:

$$a_i^{(m)} = C_{i-1}^{m-1},\ i = m, m+1, \ldots, N$$

Thus, for an N-order, M-dimensional super-matrix $$T_{\underbrace{N\times N\times \ldots \times N}_{M\uparrow}},$$

the number of elements of the super triangle area to which an integer is mapped is equal to the total number of MPPM(N, M) symbols, namely:

$$\sum_{i=M}^{N} a_i^{(M)} = \sum_{i=M}^{N} C_{i-1}^{M-1} = C_N^M$$

That is, a one-to-one mapping relationship may be established between the integers 0 to $$C_N^M - 1$$

and each symbol of the MPPM(N, M) scheme, and a corresponding one-to-one mapping may be established between all of the possible K-bit symbols B and $2^K$ (e.g., the first $2^K$) symbols of the MPPM(N, M) scheme. Here, $$K = \left\lfloor \log_2^{C_N^M} \right\rfloor,$$

$\lfloor\bullet\rfloor$, and represents a rounding down of K to the nearest integer. By using the one-to-one mapping relationship, the bit-to-symbol mapping of the MPPM(N, M) scheme is simplified, especially when M>2.

A Look-Up Table for MPPM Symbol/Pulse Sequence Mapping

A lookup table $T_{LUT}$ with $M_{max}$ rows and $N_{max}$ columns may be established using $$a_i^{(m)}.$$

The $T_{LUT}$ may have a space complexity that is less than that of a corresponding encoding table. For example, the look-up table when $N_{max}$=24, $M_{max}$=6 is as in Table 3 below. Table 3 thus correlates the number of elements $$a_i^{(m)}$$

of the super triangular area to each dimension and/or subscript of the mapping tensor.

According to the $T_{LUT}$, the bit-to-symbol mapping of MPPM(N, M) where N≤$N_{max}$, M≤$M_{max}$ is realized.

Assuming that a given K-bit sequence B is mapped to the M pulse positions in the N time slots of the MPPM(N, M) scheme as: $[p_1, p_2, \ldots, p_M]$, the mapping table and/or the lookup table may be coded and/or generated as follows:

```
Initialization:
  [p1, p2, . . . , pM] = 0;
  B = K-bit sequence(s) to be encoded;
Calculate [p1, p2, . . . , pM] from the mapping table:
  Rm = the index of the first element greater than B in the Mth row
  of TLUT;
  pM = Rm;
  for (m decreases from M to 2)

    B = B − TLUT(m, Rm − 1)

    Rm = the index of the first element greater than B in the (m − 1)th
    row of TLUT;

    pm−1 = Rm;

  End
```

Since $T_{LUT}$ contains the number of elements in each layer of each dimension of the super-triangular region mapped on the M-dimensional tensor T, the index p=$[R_1, R_2, \ldots, R_M]$ of the integer corresponding to each dimension of T can be computed from any integer between 0 and $$C_N^M - 1.$$

Taking p as a codeword symbol of the MPPM(N, M) coding scheme can realize the mapping of bit sequences to the codeword symbols of the MPPM(N, M) scheme, which can greatly reduce the space complexity at the MPPM(N, M) coding end (e.g., the encoder and/or transmitter).

Since each row of $T_{LUT}$ is arranged in ascending order, it has low lookup complexity. Alternatively or additionally, each row of the $T_{LUT}$ is a sequential table, so that a quick table lookup process or algorithm can be adopted, and a sequence table lookup process or algorithm can also be adopted for the table lookup.

Comparing the encoding complexity of the present MPPM coding scheme with that of an existing code (e.g., a conventional combinatorial or combination code [CC]):

It is assumed that the bit width range k of a bit sequence should be encoded at the encoding end as: k=1, 2, . . . , K bits, and the symbols corresponding to each bit sequence are encoded using the MPPM(N_k, M_k) scheme. Let the lookup table of the MPPM code have $M_{max}=M_K$ rows, and $N_{max}=N_K$ integers in each row. Since the integers in each row of the lookup table are arranged in ascending order, a binary search approach can be adopted in the lookup table. The number of times of searching for one line or row in the lookup table (e.g., using a bisection method) is at most no more than $\lfloor \log_2 N_K \rfloor+1$. A k-bit sequence to be encoded uses $M_k$ times the maximum number of searches in the binary search approach, and the total number of searches is no more than $\lfloor \log_2 N_K \rfloor+1$, so the complexity of the encoding time in the present MPPM coding scheme is $O(M_k \log_2 N_K)$. The MPPM coding scheme stores a lookup table with size of $M_K \times N_K$, so its space complexity is $O(M_K N_K)$.

For k-bit wide bit sequences, the existing (e.g., CC) coding scheme generates a code table with size of $2^k$ to implement the mapping of bit sequences to pulse positions. In the existing encoding process, the coding table is directly indexed using a bit sequence, and therefore the time complexity of the existing coding scheme is O(1). The existing code also stores a complete symbol pulse position mapping table, along with the k-bit code table that requires a storage space with size of $2^k$. In general, the number of combinations $$C_{N_k}^{M_k}$$

to satisfy the pulse positions when selecting $M_K$ and $N_K$ in the existing coding scheme is greater than the total number of k-bit sequences $2^k$ to reduce redundancy (that is, $$2^k \le C_N^M < 2^{k+1}).$$

Thus, the space complexity of the existing encoding to store a k-bit encoding table is actually $$O(2^k) = O\left(C_{N_k}^{M_k}\right).$$

In practical applications, the existing coding scheme needs to store all encoding tables corresponding to k=1, 2, . . . , K bit widths, which means the total space size of the encoding table is $$\sum_{k=1}^{K} 2^k,$$

while the present MPPM coding scheme only needs to store a lookup table of $M_K \times N_K$. Therefore, compared with the existing encoding scheme, although the time complexity of MPPM encoding is slightly higher than that of CC encoding, the space complexity thereof is much less than that of CC encoding, which effectively solves the problem that the space complexity of existing CC encoding increases exponentially with the increase in the bit width k.

TABLE 1

MPPM(5, 2) Encoding Table

| Symbol | Bit Sequence | Pulse Positions | Time Slot Code |
|---|---|---|---|
| 1 | 000 | 1, 2 | 11000 |
| 2 | 001 | 1, 3 | 10100 |
| 3 | 010 | 1, 4 | 10010 |
| 4 | 011 | 1, 5 | 10001 |
| 5 | 100 | 2, 3 | 01100 |
| 6 | 101 | 2, 4 | 01010 |
| 7 | 110 | 2, 5 | 01001 |
| 8 | 111 | 3, 4 | 00110 |
| 9 | — | 3, 5 | 00101 |
| 10 | — | 4, 5 | 00011 |

TABLE 2

M and N parameter table commonly used in MPPM coding schemes

| Bit width | M | N | Number of Symbols | Bit width | M | N | Number of Symbols |
|---|---|---|---|---|---|---|---|
| 1 | 1 | 2 | 2 | 9 | 4 | 13 | 512 |
| 2 | 1 | 4 | 4 | 10 | 4 | 15 | 1024 |
| 3 | 2 | 5 | 8 | 11 | 4 | 17 | 2048 |
| 4 | 2 | 7 | 16 | 12 | 5 | 16 | 4096 |
| 5 | 2 | 9 | 32 | 13 | 5 | 18 | 8192 |
| 6 | 3 | 9 | 64 | 14 | 6 | 18 | 16384 |
| 7 | 3 | 11 | 128 | 15 | 6 | 20 | 32768 |
| 8 | 3 | 13 | 256 | 16 | 6 | 22 | 65536 |

TABLE 3

Lookup table $T_{LUT}$ of MPPM with $N_{max}$ = 24, $M_{max}$ = 6

| m | $a_i^{(m+1)}$ |
|---|---|
| 1 | 1, 2, 3, 4, 5, 6, 7, 8, 9, 10, 11, 12, 13, 14, 15, 16, 17, 18, 19, 20, 21, 22, 23, 24 |
| 2 | 0, 1, 3, 6, 10, 15, 21, 28, 36, 45, 55, 66, 78, 91, 105, 120, 136, 153, 171, 190, 210, 231, 253, 276 |
| 3 | 0, 0, 1, 4, 10, 20, 35, 56, 84, 120, 165, 220, 286, 364, 455, 560, 680, 816, 969, 1140, 1330, 1540, 1771, 2024 |
| 4 | 0, 0, 0, 1, 5, 15, 35, 70, 126, 210, 330, 495, 715, 1001, 1365, 1820, 2380, 3060, 3876, 4845, 5985, 7315, 8855, 10626 |
| 5 | 0, 0, 0, 0, 1, 6, 21, 56, 126, 252, 462, 792, 1287, 2002, 3003, 4368, 6188, 8568, 11628, 15504, 20349, 26334, 33649, 42504 |
| 6 | 0, 0, 0, 0, 0, 1, 7, 28, 84, 210, 462, 924, 1716, 3003, 5005, 8008, 12376, 18564, 27132, 38760, 54264, 74613, 100947, 134596 |

As mentioned above, the present invention is useful for solving problems in signal transmission (e.g., wireless signal transmission) in petroleum exploration and/or extraction.

For example, the method may further comprise transmitting the MPPM pulse sequences to a well in the ground (e.g., to a receiver such as a wireless receiver in the well). The equipment in the well may optionally include and a decoder configured to convert the MPPM pulse sequences to a digital signal (e.g., for processing by a processor in the equipment). The MPPM pulse sequences may be transmitted from a transmitter above the ground and/or outside of the well, and may comprise a survey signal. The well may be an oil exploration well or an oil extraction well. Thus, the well may have a depth of at least 500 m (e.g., 1000 m or more, 2000 m or more, etc.) and a width or diameter of 10 cm to 2 m (e.g., 15-100 cm, or any value or range of values therein).

The method may also further comprise receiving additional MPPM pulse sequences or symbols from equipment in the well during a measurement while drilling (MWD) process. The equipment in the well may thus comprise one or more sensors configured to make one or more measurements in the well, a processor (e.g., a microprocessor or microcontroller) configured to process information from the sensor(s) and generate a digital signal therefrom, an encoder configured to convert the digital signal to MPPM(N, M) code (e.g., using the present method), and a second transmitter configured to transmit the MPPM(N, M) code to a receiver outside the well and/or above the ground. In addition, the above-ground equipment may further comprise a second receiver (e.g., wireless receiver) configured to receive the MPPM(N, M) code and a second decoder configured to convert the MPPM(N, M) code to a digital signal.

What is claimed:

1. A method of mapping bit sequences in multi-pulse position modulation (MPPM), comprising: mapping integers to a super triangle area in a multi-dimensional matrix, and generating a look-up or mapping table of MPPM pulse sequences or symbols; wherein:

mapping the integers to the super-triangular area of the multi-dimensional matrix comprises:

representing transmission of M pulses in N time slots with MPPM(N, M), wherein M is greater than or equal to 2 and N is at least 4;

constructing an N-order M-dimension matrix from MPPM(N, M), wherein each of the M dimensions is respectively denoted as: $R_1, R_2, \ldots, R_M$;

successively mapping the integers from 0 to $$C_N^M - 1$$

to a triangular area of the matrix; and mapping a first dimension of the M dimensions from a subscript 1, up to an $M^{th}$ dimension of the M dimensions from a subscript M', wherein the subscripts 1 through M' denote an index number of an element in the M-dimensional matrix, and M' is integer of 1 to N;

thereby establishing a one-to-one mapping relation between the integers 0 to $$C_N^M - 1$$

and each MPPM(N, M) pulse sequence or symbol; and generating the look-up or mapping table of the MPPM pulse sequences or symbols comprises:

establishing a lookup table with $M_{max}$ rows and $N_{max}$ columns, wherein the lookup table includes a bitmap for MPPM(N, M) such that $N \leq N_{max}$ and $M \leq M_{max}$, where $M_{max}$ and $N_{max}$ are maximum values of M and N, respectively;

initializing $[p_1, p_2, \ldots, p_M]=0$ and B=a K-bit bit sequence to be encoded, where $$K = \log_2^{C_N^M},$$

rounded down to the nearest integer; and mapping each K-bit bit sequence to M pulse positions in the N time slots in the lookup table.

2. The method of claim 1, wherein mapping comprises stacking a plurality of 1-dimensional matrices to form a 2-dimensional triangle area.

3. The method of claim 1, further comprising transmitting the M pulses to a well.

4. The method of claim 3, wherein the M pulses are in a survey signal.

5. The method of claim 3, wherein the well is an oil exploration well or an oil extraction well.

6. The method of claim 5, wherein the well has a depth of at least 500 m and a width or diameter of 10 cm to 2 m.

7. The method of claim 3, further comprising receiving additional MPPM pulse sequences or symbols from equipment in the well during a measurement while drilling (MWD) process.

8. The method of claim 1, wherein M' is an integer of 1 to N.

9. The method of claim 1, wherein when the subscript is 2 to N in the $2^{nd}$ dimension, a number of elements of 1-dimensional areas mapped from each subscript comprises, in sequence, 1, 2, 3, 4 . . . .

10. The method of claim 1, wherein M is at least 3, and the method further comprises stacking a plurality of the 2-dimensional matrices to form a 3-dimensional matrix.

11. The method of claim 10, wherein in the $3^{rd}$ dimension, when the subscript is 3 to N, a number of elements of the 2-dimensional triangle areas mapped by each subscript is, in sequence, 1, 3, 6, . . . .

12. The method of claim 1, further comprising stacking M 1-dimensional matrices to form an M-dimensional matrix, wherein in the $M^{th}$ dimension, a subscript $i=m, m+1, \ldots, N$ and a number of elements $$a_i^{(m)}$$

of the M 1-dimensional super triangular area to which each subscript maps comprises $$a_i^{(m)} = C_{i-1}^{m-1},\ i = m, m+1, \ldots, N,$$

and m=M.

13. The method of claim 12, wherein the lookup table is established using $$a_i^{(m)}.$$

14. The method of claim 1, wherein the number of elements of the super triangular area to which the integers are mapped is equal to the total number of MPPM(N, M) pulse sequences or symbols.

15. The method of claim 1, wherein the integers are 0 to $$C_N^M - 1.$$

16. The method of claim 1, wherein mapping the integers to the super-triangular area of the multi-dimensional matrix establishes a one-to-one mapping relation between each sequence of digital bits to be encoded and the MPPM pulse sequences or symbols.

17. The method of claim 1, wherein each sequence of the digital bits to be encoded has a width of N–M bits.

18. The method of claim 1, wherein the lookup table has a space complexity less than that of a corresponding encoding table.

19. The method of claim 1, wherein the mapping table comprises the integers and the multi-dimensional matrix.

20. The method of claim 1, wherein generating the look-up table of MPPM pulse sequences or symbols further comprises:

calculating $[p_1, p_2, \ldots, p_M]$ as follows:

$R_m$=the index of the first element greater than B in the $M^{th}$ row of $T_{LUT}$, where $T_{LUT}$ is the look-up table, and $p_M=R_m$;

then decrease m from M to 2, and sequentially calculate:

$$B = B - T_{LUT}(m, R_m - 1);$$

$R_m$=the index of the first element greater than B in the $(m-1)^{th}$ row of $T_{LUT}$; and $$p_{m-1} = R_m.$$

* * * * *